UNITED STATES PATENT OFFICE.

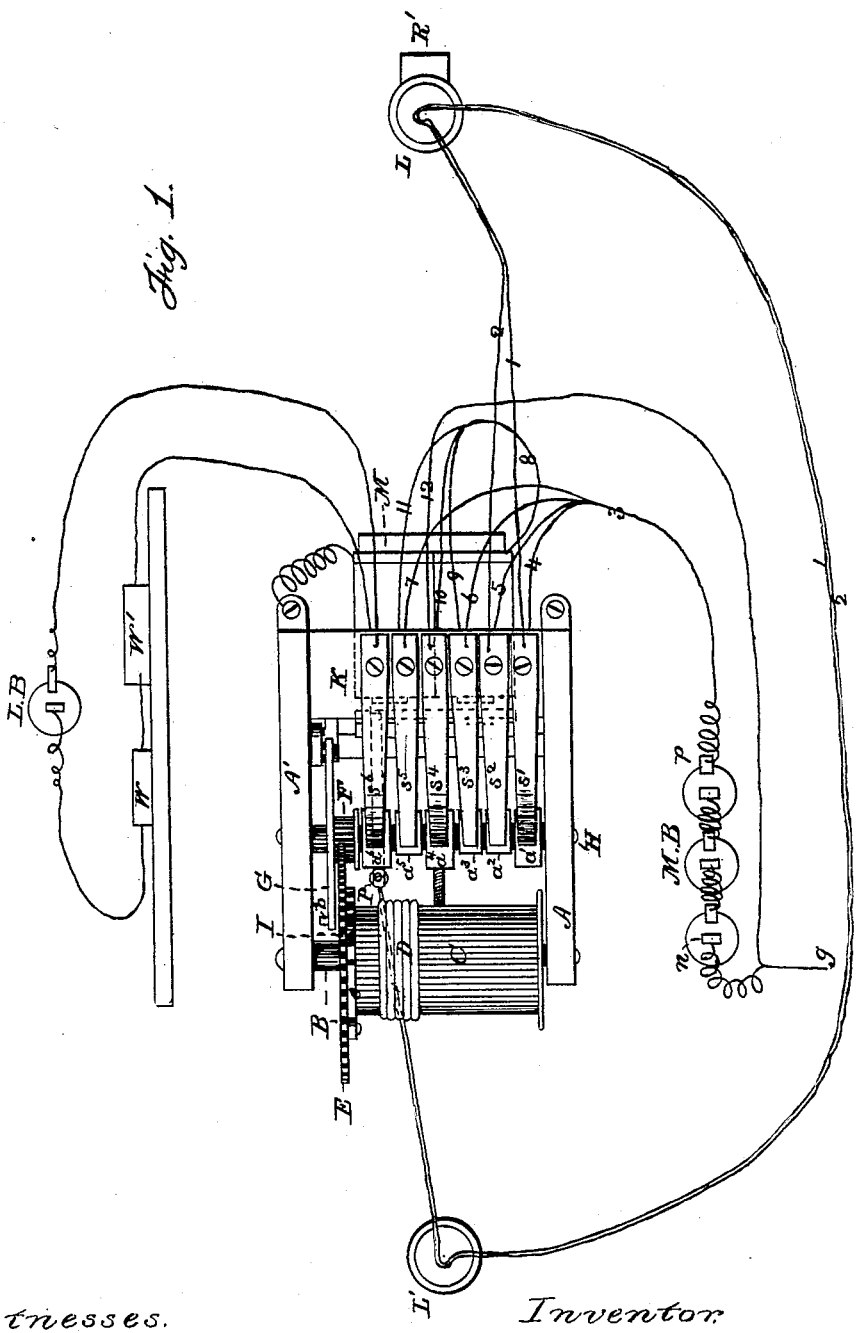

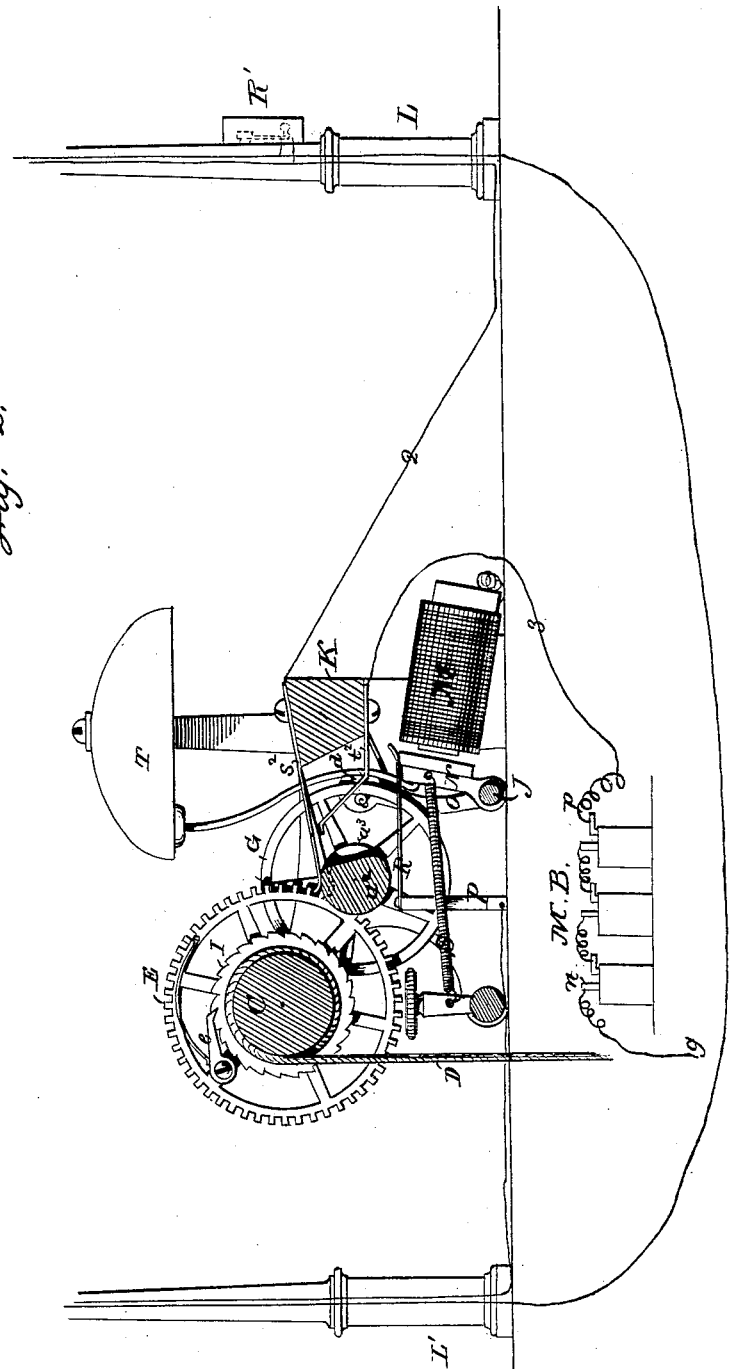

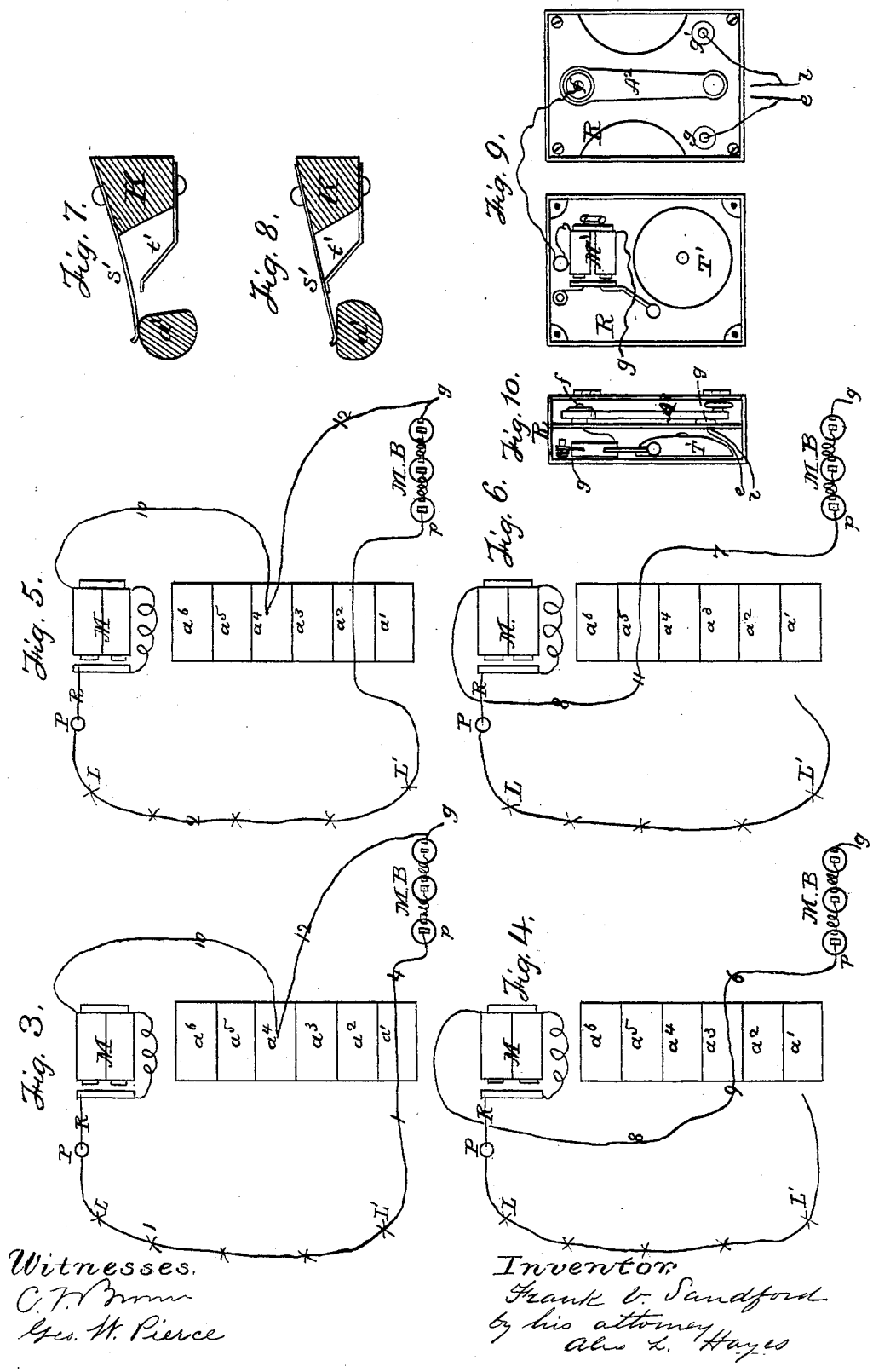

FRANK V. SANDFORD, OF CHELSEA, MASSACHUSETTS, ASSIGNOR OF ONE-HALF HIS RIGHT TO JOSEPH W. BARTLETT, OF NEW YORK, N. Y.

IMPROVEMENT IN CIRCUIT-CHANGERS IN ELECTRIC GAS-LIGHTING APPARATUS.

Specification forming part of Letters Patent No. 204,916, dated June 18, 1878; application filed March 27, 1878.

*To all whom it may concern:*

Be it known that I, FRANK V. SANDFORD, of Chelsea, in the county of Suffolk and State of Massachusetts, have invented a new and useful Improvement in Circuit-Changing Apparatus, for use in connection with a system of lighting and extinguishing street gas-lamps by electricity, of which the following is a full, clear, and exact description, reference being had to the drawing accompanying and forming part of this specification.

This invention is intended to be used in connection with the system of lighting and extinguishing street gas-lamps by electricity described in Letters Patent No. 130,770, granted to J. P. Tirrell, August 20, 1872, which system is known as the "automatic system," or any system similar thereto, and has for its object the making of the series of lamps to be automatically lighted or extinguished from any desired point in the circuit.

It also has for its object the automatic maintenance of one or more other circuits during the time that the lamps are being lighted or continue lighted.

To this end the invention consists, first, in the combination of a shaft having a constant tendency to rotate imparted to it by any suitable power; a wheel, or its equivalent, rotating with the shaft, and having on it a series of pins, or their equivalents, arranged at suitable distances from each other, as hereinafter described; an escapement which, when in its normal position, prevents the wheel and shaft from rotating, but which, when moved, allows one pin, or its equivalent, to escape and the shaft to make a partial rotation; an electro-magnet included in the circuit from the lamps, and, when energized, moving the escapement; a device which automatically breaks the circuit through the electro-magnet when the armature of said magnet is attracted; a series of cams, or equivalent devices, arranged side by side on the shaft, as hereinafter described, so as to act during different parts of the rotation of said shaft; and a series of circuit breaking and closing devices, each operated by a different cam of the series, one of which devices breaks and closes connection with one pole of the battery and the lighting-wire, a second breaks and closes connection with the same pole of the battery and the extinguishing-wire, a third breaks and closes connection with the same pole of the battery and the electro-magnet, a fourth breaks and closes connection with the other pole of the battery and the electro-magnet, and a fifth breaks and closes connection with the same pole of the battery as the first, second, and third circuit breaking and closing devices, the result accomplished by this arrangement being that after the lighting or extinguishing of the series of lamps in the circuit has been effected the connections with the battery are automatically established, so that the series of lamps in the circuit can be automatically extinguished or lighted by merely making a ground connection at any desired point in the circuit; second, in the combination, with the rotating shaft, of one or more cams, or their equivalents, and one or more circuit breaking and closing devices operated thereby, and one or more circuits established or interrupted by said devices, which circuits are closed during the time that the lamps are being lighted and continue lighted, and include suitable electro-magnetic apparatus for recording the time that the lamps continue lighted, and for indicating the continuity of the circuit.

In the accompanying drawings, Figure 1, Sheet 1, is a plan view of the apparatus and its connections, showing the cams in the position that they have when the lighting is being effected. Fig. 2, Sheet 2, is a longitudinal sectional view of the apparatus. Fig. 3, Sheet 3, is a diagram, showing the arrangement of the cams and their connections when the lighting is being effected. Fig. 4, Sheet 3, is a diagram, showing the arrangement of the connections when the lamps are lighted. Fig. 5, Sheet 3, is a diagram, showing the arrangement of the connections when the extinguishing is being effected. Fig. 6, Sheet 3, is a diagram, showing the arrangement of the connections when the lamps are extinguished. Fig. 7, Sheet 3, is a sectional view, showing the position of the cam and circuit breaking and closing springs when the circuit is broken. Fig. 8, Sheet 3, is a sectional view, showing the position of the cam and the circuit breaking and closing springs when the circuit is closed. Fig. 9, Sheet 3, is a front view of the signaling-key and alarm; and Fig. 10, Sheet 3, is a side view of the same.

In these several figures similar letters refer to similar parts.

A A' are two parallel base-plates, which support and afford bearings for the rotating shafts of the apparatus. B is a shaft, supported between these plates, and upon this shaft is a drum, C, upon which is wound the cord D, having a weight attached thereto, and, by means of this weight and cord, a tendency to rotate is imparted to the drum C and shaft B. Upon this shaft is a gear-wheel, E, which gears with a pinion, F, on the shaft H, also supported by the plates A A', and imparts a tendency to rotate to said shaft; but, instead of the weight, drum, and gear-wheel, any suitable clock-work mechanism operated by any suitable power may be used for imparting a tendency to rotate to the shaft H. Fixed upon the shaft H is a wheel or disk, G, having four pins, $b$ $b^1$ $b^2$ $b^3$, on the inner face of its rim, at ninety degrees distance from each other; and also fixed upon the shaft H are six cams, of hard rubber or other suitable insulating substance, $a^1$, $a^2$, $a^3$, $a^4$, $a^5$ and $a^6$, of the form shown in Figs. 7 and 8, Sheet 3, arranged side by side, and so placed that the projecting parts of all of the cams are not in the same line, as shown in Fig. 1, though two or more may be. Resting upon each of these cams is a flat spring, $s^1$, $s^2$, $s^3$, $s^4$, $s^5$, and $s^6$, one end of each of these springs being secured to a block, $k$, of hard rubber or other suitable material, between the plates A A', and on the other side of this block K are secured a series of corresponding springs, $t^1$, $t^2$, $t^3$, $t^4$ $t^5$, and $t^6$, which are so shaped that when the upper spring is not elevated by the cam, but is in the position shown in Fig. 8, the two springs are in contact with each other. M is an electro-magnet under the block K; and N, Fig. 2, is its armature, which is pivoted to a rock-shaft, J, supported between the plates A A$^1$. This rock-shaft also carries an arm, O, having a double stud-escapement on its extremity, $c$ and $d$ being the pins of this escapement. P is a metallic post, attached to the base-plate of the apparatus, and has attached to its upper end a flat spring, R, one end of which rests upon the armature N of the electro-magnet M, but is of such length that it breaks contact with the said armature when the latter is attracted by the electro-magnet M.

M B is the main battery, and L L' represent the terminal lamps of a series, provided with electrical gas-lighting apparatus and operated by the said battery.

In order that the operation of this invention and the arrangement of the connections may be understood, it must be borne in mind that in the system of gas-lighting apparatus with which this invention is intended to be used there are two separate circuits, one for lighting and the other for extinguishing, and through these circuits an electro-magnet at each lamp is operated to produce a vibratory movement in a pawl, which acts upon a ratchet-wheel on the gas-cock, and effects the rotation of said gas-cock for turning the gas on or off. In this apparatus, while the electro-magnet at each lamp is operating either to turn on the gas or to turn it off, connection is made with the ground; but as soon as the gas-cock is rotated, so that the gas is turned on or off, the said electro-magnet is cut out of the circuit, connection is established with the next burner, and the electro-magnet at the lamp which has been lighted or extinguished is put in connection with the other circuit. The result of this is that after the entire series of lamps is lighted or extinguished a completed circuit is established through the whole series, and there is no ground-connection with the line, except through the current-shifting apparatus.

Fig. 1 shows the arrangement of the connections. This is as follows: 1 is the lighting-wire, and 2 is the extinguishing-wire, which wires are connected, respectively, to the springs $s^1$ $s^2$, and pass through the circuit to the post P. 3 is a wire passing from the positive pole of the battery M B, and 4 is a branch wire from the wire 3, leading to the spring $t^1$ under the spring $s^1$. 5 is another branch wire, leading to the spring $t^2$ under the spring $s^2$; 6, another branch wire, leading to the spring $s^3$; and 7, another branch wire, leading to the spring $s^5$. 8 is a wire passing from one pole of the electro-magnet M, and 9 is a branch wire from said wire 8, passing to the spring $t^3$ under the spring $s^3$. 10 is another branch to the spring $t^4$ under the spring $s^4$; 11, another branch wire to the spring $t^5$ under the spring $s^5$; and 12 is a wire passing from the spring $s^4$ to the negative pole of the battery or to its ground-connection. The other pole of the magnet is connected to the metallic parts of the instrument.

In Fig. 1 the cams are shown in the position that they have when the lamps are being lighted. The spring $s^1$ is depressed and in contact with its corresponding spring $t^1$, so that connection is established with the battery and the lighting-wire; and the spring $s^4$ is also depressed and in contact with its corresponding spring $t^4$, so that connection is established with the ground-connection of the battery and the electro-magnet M through the wires 8, 10, and 12. This position of the connections is also shown in the diagram, Fig. 3, Sheet 3.

The operation of this apparatus is as follows: Supposing the cams to be in the position shown in Fig. 1 and indicated in the diagram, Fig. 3, Sheet 3, on making connection with the battery at the apparatus by a suitable key, the current will pass from the positive pole of the battery to the wire 3, thence by the wire 4 to the spring $t^1$, thence by the spring $s^1$ to the lighting-wire 1, and thence to lamp L, and thence to ground, causing the electro-magnet in said lamp to operate to effect the turning on and lighting of the gas; and when the gas-cock is turned, as before stated, the current passes to the next lamp and ground, effecting the lighting of that lamp, and so through the series of lamps, lighting each in turn until it reaches the post P, from which it passes by the spring R to the armature of the electro-magnet, and thence by the metallic parts of the instrument to the electro-magnet M, and through the magnet M to the wire 8, and, by branch wire 10, springs $t^4$ and $s^4$, to wire 12 and the ground-connection of the battery. As soon, however, as the electro-magnet M is energized it attracts its armature N, thereby causing the movement of the escapement on the arm. The pin $b$ consequently escapes from the pin $d$ of the escapement. At the same time, by the escape of the spring R from the armature, the circuit is broken, the spring S restores the armature to its original position, the pin $b$ is permitted to escape from the pin $c$ of the escapement, and the shaft H, being free to move under the influence of the clock-work, rotates one-quarter of a rotation until the pin $b^1$ on the wheel G makes contact with the pin $d'$ of the escapement, and the further rotation of the wheel G and shaft H is arrested. By this one-quarter rotation the connections are changed. The flat part of the cam $a^3$ comes uppermost, and the spring $s^3$ makes contact with the spring $t^3$, while, by the change in the position of the cams $a^1$ and $a^4$, their springs, $s^1$ and $s^4$, are elevated from contact with their corresponding lower springs, $t^1$ and $t^4$; and the positive pole of the battery, instead of being connected to the line-wire, is now connected to the electro-magnet by wires 3 and 6, springs $s^3$ and $t^3$, and wires 9 and 8, and by the elevation of the spring $s^4$ the connection of the line with the ground is broken.

The connections are now as indicated in the diagram, Fig. 4, Sheet 3, and, as will be evident from said diagram, the circuit may be completed by establishing a ground-connection at any point in the circuit, as, for instance, at any one of the series of lamps. When this is done the electro-magnet M will be energized, the escapement-lever O will be moved, owing to the attraction of the armature N, the pin $b^1$ on the wheel G will be allowed to escape in the manner before explained, the shaft H will make another quarter-rotation, and the position of the cams on the shaft will be again changed. The flat portion of the cam $a^2$ will now come uppermost, so that springs $s^2$ and $t^2$ will make contact, the cam $a^4$ will be so moved that the springs $s^4$ and $t^4$ will make contact, the cam $a^3$ will be so moved that the springs $s^3$ and $t^3$ will break contact, and the current will pass from the positive pole of the battery by wires 3 and 5, springs $s^2$ and $t^2$ to the extinguishing-wire 2; thence through each lamp, as before, causing each lamp to be extinguished in turn; and thence, as before, through the electro-magnet M, springs $s^4$ and $t^4$, and wire 12 to the ground, as shown in the diagram, Fig. 5, Sheet 3. The magnet M will now be again energized, the shaft H will make another quarter-rotation, the flat part of the cam $a^5$ will come uppermost, the springs $s^5$ and $t^5$ will make contact, and by the change in the position of the cams $a^2$ and $a^4$ the springs $s^2$ and $t^2$ and $s^4$ and $t^4$ will break contact, the positive pole of the battery will be connected by the wires 3 and 7, springs $s^5$ and $t^5$, and wires 11 and 8 to the electro-magnet M, and the connection of the line with the ground broken, as shown in Fig. 6, Sheet 3.

It will thus be seen that, after the series of lamps are either lighted or extinguished, the connections are left in such a position that the extinguishing or lighting will be automatically effected by making a ground-connection at any desired point in the circuit, which is an important result, inasmuch as it enables the lamps to be under the control of the police, who can light or extinguish the lamps, as it may be necessary to do so, without leaving their beats.

Figs. 9 and 10, Sheet 3, show the key which is used for establishing the ground-connections at a lamp, and the alarm or device for giving an audible signal connected with this key. The key is of the usual spring form, and is connected to the ground at $f$. $g$ is a knob, connected with the lighting-wire, and $g'$ a knob connected with the extinguishing-wire. Connection is made with the ground and either of these wires by putting the key in contact with the knob connected with said wire. In the ground-wire is placed an ordinary electro-magnetic signal-bell, T, which will sound when a ground-connection is made if the circuit through the shifting apparatus is intact. Instead of a bell, any suitable device operated by electro-magnetism and giving an audible signal may be used.

Upon the shaft H is another cam, $a^6$, which acts upon a spring, $s^6$, connected to one pole of a battery, L B; and under this spring is another spring, $t^6$, which is connected to the other pole of the same battery. This cam is so placed on the shaft H that when the connections are arranged as when the lamps are being lighted or continue lighted, as shown in the diagrams, Figs. 3 and 4, Sheet 3, the springs $s^6$ and $t^6$ will be in contact, and the circuit from the battery L B will be completed. In this circuit I propose to put the recording-instrument patented by me August 3, 1875, Letters Patent No. 166,304, which operates as long as the lamps continue lighted, and also an apparatus, which will form the subject of a future application for a patent, for indicating the point at which the circuit is broken should a leak occur. I can also put in this circuit other electro-magnetic apparatus. Instead of the cam $a^6$ and its circuit, I can have several additional cams on the shaft and several circuits, and I can have the recording apparatus in one circuit and the indicating apparatus in another circuit. The arrangement of these cams to the other cams may be as may be necessary.

Instead of the cams and springs for breaking and closing the circuit, I can use any other form of circuit breaking and closing devices; and instead of arranging the cams and the pins on the wheel G, so that the connections will be changed by a quarter-turn of the shaft, they may be so placed that any partial rotation of the shaft will effect the change of connections.

Instead of the spring R for automatically breaking the circuit when the armature of the electro-magnet M is attached, I can use any other device which will accomplish the same result.

What I claim as my invention, and desire to secure by Letters Patent of the United States, is—

1. In combination with the automatic system of lighting and extinguishing street gas-lamps by electricity, apparatus operating on the completion of the lighting or extinguishing of all the lamps in the circuit to reverse the connection of the battery with the line, to break the connection of the line with the earth, and to leave the connections, as described, so that if the lamps are lighted they will be automatically extinguished by making a ground-connection at any desired point in the circuit, and if extinguished they will be automatically lighted by also making a ground-connection at any desired point in the circuit, substantially as and for the purpose set forth.

2. In combination with the automatic system of lighting and extinguishing street gas-lamps by electricity and the electric connections, as described, apparatus composed of the following elements in combination, namely: a shaft having a tendency to rotate imparted to it by any suitable power, and provided with a series of cams, or their equivalents, arranged as described; a series of circuit breaking and closing devices, each operated by one of the series of cams; a wheel, or its equivalent, rotating with the shaft, and provided with a series of pins, or their equivalents, placed at any desired distance from each other, as described; an escapement which, in its normal position, prevents the wheel and shaft from rotating, but which, when moved, allows one pin, or its equivalent, to escape and the shaft to make a partial rotation; an electro-magnet included in the circuit from the lamps, and when energized moving the escapement; and a device automatically breaking the circuit through the electro-magnet when the armature of said electro-magnet is attracted, substantially as and for the purpose set forth.

3. In combination with the automatic system of lighting and extinguishing street gas-lamps by electricity, and the current-shifting apparatus and its connections, as described, one or more keys for establishing a ground-connection with the line, situated at any desired point or points on the line, substantially as and for the purpose set forth.

4. In combination with the rotating shaft of the current-shifting apparatus, as described, a suitable circuit breaking and closing device operated thereby, and one or more electro-magnetic apparatus included in said circuit, said circuit breaking and closing device acting to close the local circuit while the series of lamps are being lighted or continue lighted, substantially as and for the purpose set forth.

5. In combination with the automatic system of lighting and extinguishing street gas-lamps by electricity and the electric connections, as described, the following elements in combination, namely: the shaft H, mechanism imparting a tendency to rotate to said shaft, a series of cams, $a^1$, $a^2$, $a^3$, $a^4$, $a^5$, and $a^6$, on said shaft, a series of circuit breaking and closing devices, as described, each operated by one of said cams, or its equivalent, the wheel G, or its equivalent, provided with a series of pins, or their equivalents, as described, the lever O, carrying the pins $c\ d$, as described, the rock-shaft J, armature $h$, spring K, or its equivalent, post R, or its equivalent, spring S, Fig. 2, or its equivalent, and the electro-magnet M, substantially as and for the purpose set forth.

In witness whereof I have hereunto set my hand.

FRANK V. SANDFORD.

In presence of—
  J. W. BARTLETT,
  I. MORRISON.